Figure 1:
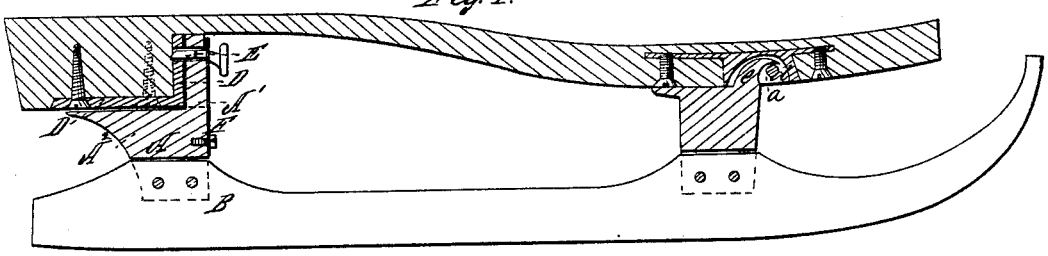
Figure 2:
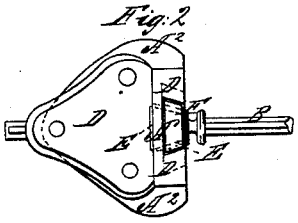
Figure 3:
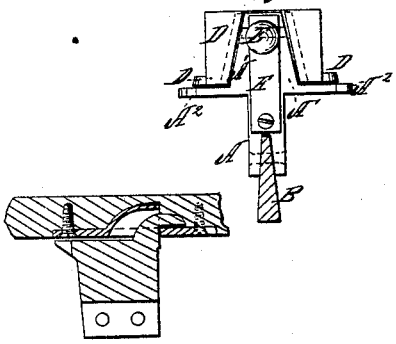

-9-11.3

NO PRINTED SPECIFICATION AVAILABLE

T. S. Whitman,

Skate,

No. 283. A. I. Patented June 19, 1860.

Witnesses:

W. Duach

Inventor:

Thomas S. Whitman

AM. PHOTO-LITHO. CO. N.Y. (OSBORNE'S PROCESS.)